March 22, 1960
D. B. J. W. BROWN
2,929,661
RECTILINEAR BALL BEARINGS
Filed May 18, 1956
3 Sheets-Sheet 1
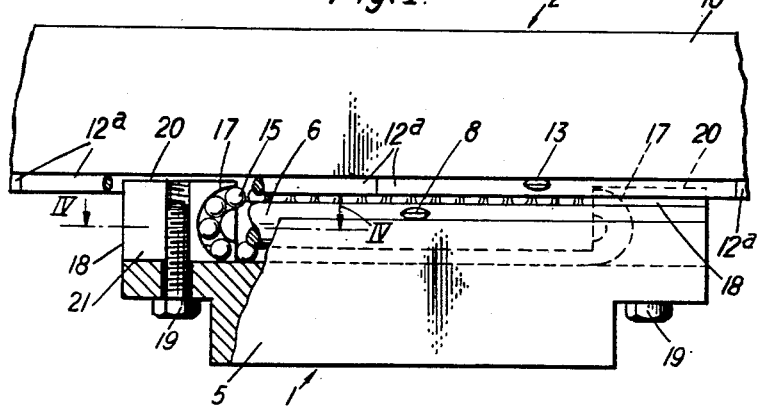
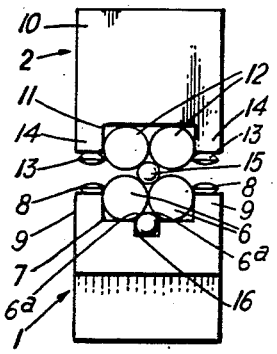
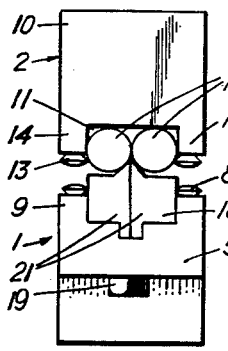
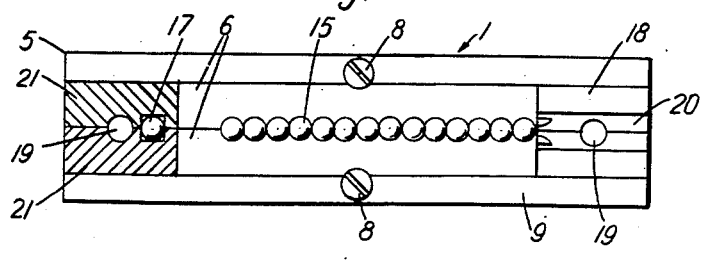
Inventor
DENNIS B. J. W. BROWN
By March 22, 1960   D. B. J. W. BROWN   2,929,661
RECTILINEAR BALL BEARINGS
Filed May 18, 1956   3 Sheets-Sheet 2
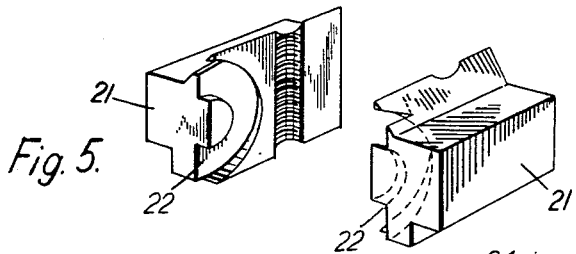
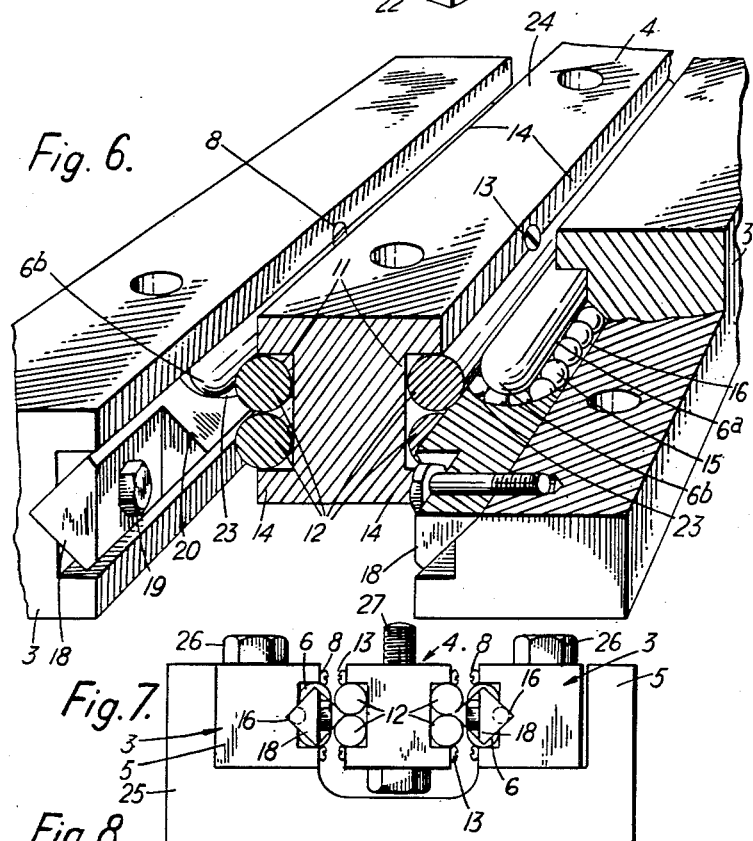
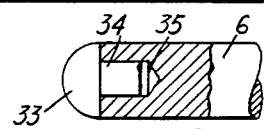
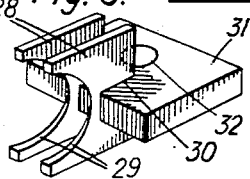
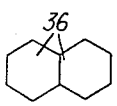
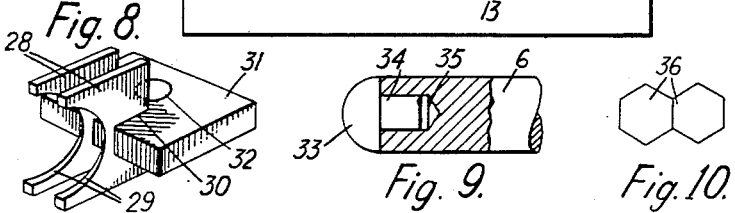
Inventor
DENNIS B. J. W. BROWN
By March 22, 1960   D. B. J. W. BROWN   2,929,661
RECTILINEAR BALL BEARINGS
Filed May 18, 1956   3 Sheets-Sheet 3

Inventor
DENNIS B. J. W. BROWN
By

United States Patent Office 2,929,661
Patented Mar. 22, 1960

2,929,661

RECTILINEAR BALL BEARINGS

Dennis Bertie John William Brown, High Wycombe, England, assignor to Dexter & Company (High Wycombe) Limited, High Wycombe, England, a British company Application May 18, 1956, Serial No. 585,710

Claims priority, application Great Britain May 26, 1955

7 Claims. (Cl. 308—6)

This invention has reference to improvements in and relating to rectilinear ball bearings of the type comprising two parallel ball tracks of different length and balls which, when one element of the bearing provided with one of the tracks is longitudinally moved relatively to the other bearing element provided with the other track, circulate in a closed circuit comprising the shorter track and a guideway extending from one end of the shorter track to the other end thereof, said guideway being stationary in relation to the shorter track.

Bearings to which the invention is applied have the shorter track defined by two parallel track rods, and the longer track is preferably defined by two parallel track rods. The longer track may if desired be provided by any other suitable surface or surfaces, for example, by the surface of a cylindrical bar, shaft or tube, longitudinal facets on parallel bars or by a V-grooved member.

The principal objects of the invention are the provision of a bearing element comprising the shorter track rods, and the provision of a bearing comprising the said element and an element comprising a longer ball track, wherein the guideway in the element having the shorter track is provided in a particularly simple manner.

In accordance with the invention therefore, there is provided an element for a ball bearing wherein the balls circulate in a path comprising a rectilinear bearing track and a guideway extending from one end of the bearing track to the other, said bearing track being defined by two parallel track rods, characterised in that part of the back faces of the said rods define part of the guideway. Preferably to complete that part of the guideway flanked by the said rods, a carrier for the rods is provided with a longitudinal groove which is located oposite the back faces of the said rods; and the ends of the guideway are preferably either defined by part circular grooves in guide blocks at the ends of the rods or by part circular cavities in guide blocks or plates and substantially hemispherical ends on the rods entering the said cavities so as to produce a substantially semi-circular passage at each end of the rods.

The guide blocks are preferably provided with teeth or projections adapted to enter the space between the two tracking lines of the bearing track of a second ball bearing element when the two bearing elements are assembled in cooperative relation, for the purpose of clearing the track in the second element of foreign matter and/or more effectively directing the balls to and from the guideway. The foreign matter is usually in the form of fine damp particles which tend to accumulate in the said space over an extended period of time.

The teeth or projections are preferably substantially of V-shape and their flanks and peaks extend nearly to the rods. The extensions, therefore, loosen the foreign matter during the operation of the bearing.

The term "Rods" used herein is to be taken to include rods each of which may be built up from a number of co-axial abutting sections. The groove flanking the guideway may be of square, V, part-round or other suitable section; and since the balls when in the guideway carry no load the guideway is of a size sufficient to permit of the free travel of the balls therealong.

The present invention is not limited to a bearing assembly comprising two parallel rows of balls; the bearing may be used in cases wherein but a single row of balls forming part of a closed ball circuit is sufficient for the purpose required, or the invention may be incorporated in a bearing assembly comprising three or more parallel rows of balls each forming part of a closed ball circuit. An assembly comprising three or more such rows may be incorporated in telescopic tubes, such as telescopic tubes forming part of retractable undercarriages provided in aircraft.

The invention will now be described with reference to the accompanying drawings wherein:

Fig. 1 is a side elevation partly in section of a bearing comprising a bearing element 1 beneath a longer element 2, the element 1 having the shorter ball track and the guideway for the balls;

Fig. 2 is an end elevation of the bearing shown in Fig. 1 the guide block at the end shown having been omitted;

Fig. 3 is an end elevation of the said bearing including the guide block;

Fig. 4 is a plan view of the element 1, one of the guide blocks being shown in section on the line IV—IV, Fig. 1;

Fig. 5 is an exploded perspective view of either guide block shown in the preceding figures;

Figure 11:
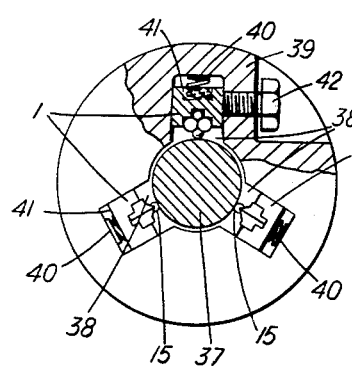
Figure 12:
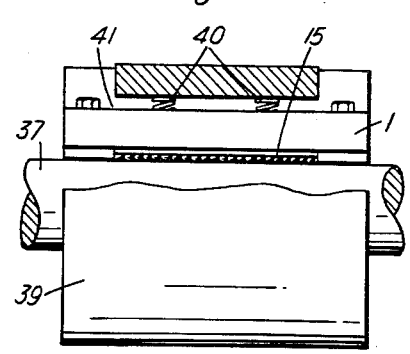
Figure 13:
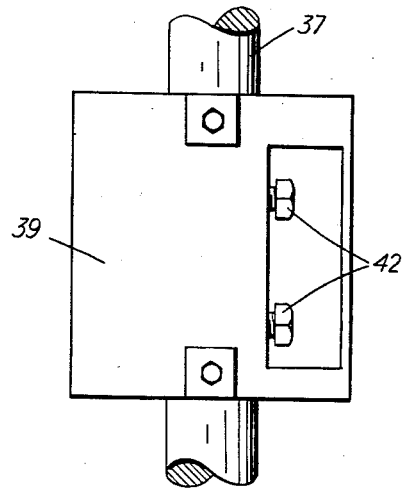

Fig. 6 is a perspective view of a bearing comprising two bearing elements 3 between which is a bearing element 4 having at its sides tracks for cooperation with the balls in the elements 3, said element 4 being the element which in practice has the longer tracks;

Fig. 7 is an end view of the bearing shown in Fig. 6 in a mounting, such as part of a machine;

Fig. 8 is a perspective view of a ball-guiding block comprising two spaced parallel plates;

Fig. 9 is a detail concerned with the track rods;

Fig. 10 is an end view of an example of a pair of longitudinally faceted rods, in this example, rods of hexagonal section;

Fig. 11 is an end elevation partly in section showing a bearing assembly for a cylindrical shaft adapted to move longitudinally, the shaft itself providing the longer tracks for the balls which travel in guideways in bearing elements;

Fig. 12 is a side elevation partly in section of the assembly shown in Fig. 11; and Fig. 13 is a plan view of the said bearing assembly.

The bearing element 1 shown in Figs. 1, 2, 3 and 4 comprises a carrier 5 for a pair of cylindrical track rods 6 said rods being in a groove 7 in the carrier of lesser depth than the diameter of the rods and being held in place by the heads 8 of screws which enter the flanges 9 formed by grooving the carrier.

The element 2 comprises a carrier 10 which is grooved at 11 for the reception of a pair of cylindrical track rods 12 having a diameter greater than the depth of the groove. The heads 13 of screws entering the flanges 14 of the carrier hold the rods in the groove. Each rod 12 is provided by a run of rod sections 12ᵃ abutting end-on.

The balls which run in the tracks provided by the pairs of rods and are cageless are indicated by 15.

In accordance with the invention part of the guideway for the balls 15 is defined by part of the back faces 6ᵃ of the rods 6, the rod faces which provide the bearing track or race for the balls being regarded as the front faces of the rods. Opposite this part of the guideway defined by the faces 6ᵃ is a groove 16 in the carrier in the bottom of the groove 7 which groove 16 jointly with the said faces 6ᵃ provides that part of the guideway between the ends of the rods 6.

The ends of the guideway are defined by substantially semi-circular channels 17 in guide blocks 18 at the ends of the rods, said guide blocks being a precision fit in the ends of the groove 7 and being held in place by bolts 19. In order that the upper ends of the channels can register with the balls in the race the tops of the blocks have central projections 20 in which the said upper ends are formed and which are substantially of V-form so that they can enter the ball space between the track 12. The projections are also provided for the purpose of clearing the said space of foreign matter which may tend to accumulate therein.

The ends of the rods 6 are plane and abut the adjacent ends of the block 18.

Each block consists of two halves 21 (see also Fig. 5). Each half of each block abuts its fellow half on one face and in this face is a substantially semi-circular groove 22 which is complementary to the groove in the abutting face so that the said grooves provide the channel 17. It will be evident that the blocks are constructed in this way for ease of production of the channel 17.

The elements 3, Figs. 6 and 7, are similar in principle to the elements 1 and corresponding parts have been given the same reference characters. The chief constructional differences reside in that the guide blocks 18, Figs. 6 and 7, are each in one piece and instead of having channels for guiding the balls 15 have substantially semi-circular cavities 23 around which the balls travel; and the ends of the rods 6 are rounded at 6ᵇ and project into the cavities sufficiently to define channels, comparable with the channels 17, for guiding the balls to and from that part of the guideway defined by the back faces 6ᵃ of the rods, Figs. 6 and 7, and the groove 16 (a V-groove in these two figures). Element 4 comprises a carrier 24 of I-section and has two pairs of track rods 12 in its grooves 11, said rods being held by the heads 13 of screws entering the flanges 14. Elements 3 are secured in spaced relation to a mounting 25 by bolts 26. Element 4 is located between elements 3 so that the balls run between adjacent pairs of rods. Element 4 is secured to a machine part or the like movable relatively to the mounting 24 by bolts 27.

Cavities adapted jointly with the rounded ends of the rods shown in Figs. 6 and 7 to provide guide channels for the balls at the ends of the shorter race may, if desired, be provided by the use of spaced parallel plates 28, Fig. 8. Each plate has a substantially semi-circular cavity 29 providing the concave guiding part of the channel. The plates are fixed in slots 30 in a plate 31 having a hole 32 enabling it to be bolted to a carrier 5.

The rounded ends of the rods shown in Figs. 6 and 7 are integral with the rods. The said rounded ends may, however, as shown in Fig. 9 be provided by the rounded heads 33 of plugs 34 forced into holes 35 drilled in the ends of the rods 6.

Although cylindrical rods are preferably used in bearings and bearing elements according to the invention longitudinally faceted rods may, if desired, be used instead. For example the hexagonal rods 36 shown in Fig. 10 may be employed.

Figs. 11, 12 and 13 show an assembly comprising three bearing elements for cylindrical shaft or bar 37 adapted to travel longitudinally. Three bearing elements 1 are arranged equidistantly around the shaft so that the surface of the shaft provides the longer track for the balls 15. Each carrier 5 is located within a parallel sided longitudinal slot 38 the mid plane of which is radial with respect to the shaft 37, said slots being in a housing 39. The carriers are a tolerance fit in their respective slots so that they can slide radially. When the bearing elements are assembled around the shaft springs 40 between the back faces 41 of the carriers and the slot faces opposite to the said back faces exert a predetermined pressure or pre-load on the balls by thrusting the carrier radially inwards. Finally the carriers are locked in their slots by lock bolts 42. Hence the predetermined pre-load exerted by the springs is permanently held although the carriers are held rigidly to the housing by the said bolts.

It will be seen by reference, for example, to Figs. 2 and 7 that the depth of the grooves 16 exceeds the diameter of the rods 6 by a little more than half the diameter of the balls; and because in most cases the carriers can accommodate the grooves without requiring to be correspondingly increased in the direction of the depth of the grooves the invention usually permits the construction of rectilinear bearings comprising track rods and circulatory balls of the same minimum dimensions as rectilinear bearings comprising track rods and non-circulatory balls.

What I claim is:

1. A bearing assembly comprising a shaft, a sleeve having a bore through which said shaft extends, said sleeve having a plurality of longitudinal channels opening into said bore radially thereof and equally spaced therearound, a rectilinear ball bearing in each of said channels and including a carrier slidably nested for radial adjustment in the respective channel and having a ball track along its inner face and a guideway in communication with both ends of said track and forming an endless race with a plurality of balls in the endless race and bearing on said shaft when in said track, springs between each of said carriers and the bottoms of said channels and equalizing the engagement of said rectilinear bearings with said shaft, and clamp means carried by said sleeve and engageable with said carriers for securing said bearings in equalized relation.

2. An element for a rectilinear ball bearing wherein the balls circulate in an endless path and including a ball track and a guideway extending from one end of the track to the other, comprising a track carrier having a relatively wide longitudinal groove in one of its faces, a second relatively narrow groove in the bottom of said wide groove and extending substantially the length thereof, a pair of longitudinal track rods of cylindrical cross section mounted within said wide groove in parallel adjacent relation with their longitudinal adjacent sides overlapping the mouth of said narrow groove, and end guide means including concave guide blocks in said grooves adjacent the ends of said rods, and convexly rounded guide members at the ends of said rods and extending into said concave guide blocks, said rods defining said ball track and jointly with said narrow groove and said guide means defining said guideway.

3. An element according to claim 2 wherein said guide blocks extend into and have a precision fit in said narrow groove to accurately locate said blocks relative to said track rods and guideway.

4. An element for a rectilinear ball bearing wherein the balls circulate in an endless path and including a ball track and a guideway extending from one end of the track to the other, comprising a track carrier having a longitudinal groove in one of its faces, said groove having its mouth in said face, a pair of longitudinal track rods of cylindrical cross section, means mounting said track rods on said carrier in parallel adjacent relation to define said ball track, said track rods being disposed in alignment with said groove with the adjacent sides of said track rods overlapping the mouth of said groove and defining with the bottom of said groove the major portion of said guideway, and guide means on said carrier at the ends of said track rods and completing said guideway, said guide means including concave guide members mounted in said groove adjacent the ends of said track rods and convexly rounded guide elements at the ends of said rods and extending into the cavity of said concave guide members to define therewith arcuate raceways completing said guideways, said guide members having a precision fit with the sides of said groove to accurately locate said members relative to said ball track and the major portion of said guideway.

5. An element according to claim 4 wherein said track rods are mounted within said groove and the bottom of said groove is longitudinally recessed to form with said track rods the major portion of the guideway, said guide members having a precision fit with both the sides and bottom of said groove.

6. An element according to claim 4 wherein said concave guide members comprise guide blocks having substantially part-circular cavities, said convexly rounded guide elements comprise substantially semispherical portions at the ends of said rods and extending into said cavities in spaced relation to the surfaces of said cavities to provide curved spaces defining the ends of the guideway.

7. An element according to claim 6 wherein said guide blocks comprise two spaced parallel plates at each end of the rods, said plates having the cavities and each pair of plates being borne by a plate mounted in a carrier for the rods.

References Cited in the file of this patent

UNITED STATES PATENTS

| | | |
|---|---|---|
| 992,008 | Lane | May 9, 1911 |
| 2,595,482 | Palumbo | May 6, 1952 |
| 2,599,969 | Bajulaz | June 10, 1952 |
| 2,634,175 | Kennedy | Apr. 7, 1953 |
| 2,672,378 | McVey | Mar. 16, 1954 |
| 2,672,379 | McVey | Mar. 16, 1954 |

FOREIGN PATENTS

| | | |
|---|---|---|
| 125,573 | Austria | Nov. 25, 1931 |
| 1,045,283 | France | June 24, 1953 |